(12) United States Patent
Takahari (10) Patent No.: US 6,560,208 B1
(45) Date of Patent: May 6, 2003

(54) WIRELESS REPEATING APPARATUS

(75) Inventor: Kunio Takahari, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,312

(22) Filed: Dec. 8, 1999

(30) Foreign Application Priority Data

Jun. 10, 1999 (JP) ............................................ 11-163706

(51) Int. Cl.⁷ ................................................. H04Q 7/28
(52) U.S. Cl. ...................... 370/327; 370/315; 455/11.1; 455/414
(58) Field of Search ................................. 370/315, 316, 370/327, 349, 337, 350; 455/7, 11.1, 12.1, 13.1, 412, 413, 414; 379/355.01, 333.02, 333.04

(56) References Cited

U.S. PATENT DOCUMENTS

| | | | | |
|---|---|---|---|---|
| 4,794,649 A | * | 12/1988 | Fujiwara | .......................... 455/9 |
| 5,170,428 A | * | 12/1992 | Watanabe et al. | ......... 379/100.1 |
| 5,327,580 A | * | 7/1994 | Vignali et al. | .............. 455/11.1 |
| 5,592,470 A | * | 1/1997 | Rudrapatna et al. | ......... 370/320 |
| 5,633,876 A | * | 5/1997 | Dinkins | ....................... 370/315 |
| 5,794,116 A | * | 8/1998 | Matsuda et al. | ............. 725/114 |
| 5,883,884 A | * | 3/1999 | Atkinson | ..................... 370/279 |
| 6,055,429 A | * | 4/2000 | Lynch | ....................... 455/445 |
| 6,115,369 A | * | 9/2000 | Oura | ........................... 370/337 |
| 6,141,533 A | * | 10/2000 | Wilson et al. | .............. 455/11.1 |
| 6,151,491 A | * | 11/2000 | Farris et al. | .................. 455/412 |
| 6,185,205 B1 | * | 2/2001 | Sharrit et al. | ................ 370/389 |
| 6,480,313 B1 | * | 11/2002 | Kawamura | ................... 359/174 |

FOREIGN PATENT DOCUMENTS

| | | |
|---|---|---|
| JP | 10-32538 | 2/1998 |
| JP | 10-233726 | 9/1998 |

* cited by examiner

Primary Examiner—Nay Maung
Assistant Examiner—Joy Contee
(74) Attorney, Agent, or Firm—Leydig, Voit & Mayer, Ltd.

(57) ABSTRACT

Wireless repeating apparatus are arranged so that a series of information items transmitted from either a portable wireless information terminal or an information processing apparatus are stored in an information storing unit. When transmission requests for the stored information are received from the portable wireless information terminals by an information transmitting/receiving unit, the stored information is read from the information storing unit, and transmitted by electromagnetic waves to the portable wireless information terminals.

12 Claims, 4 Drawing Sheets

WIRELESS REPEATING APPARATUS

BACKGROUND OF THE INVENTION

1. Field of the Invention

The present invention is related to a wireless repeating apparatus, and more specifically, to a wireless repeating apparatus for receiving digital information by way of electromagnetic waves and for transmitting the received digital information to another apparatus by way of electromagnetic waves.

2. Description of the Related Art

Figure 6:
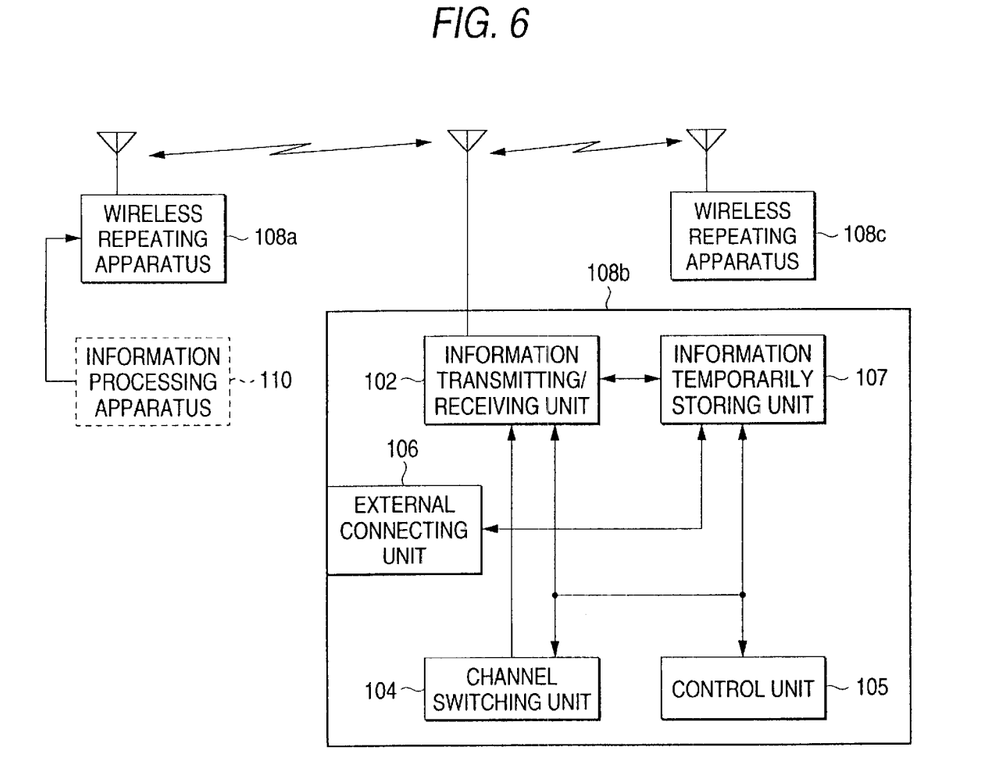
FIG. 6 is a block diagram representing one structural example of the conventional wireless repeating apparatus.

Very recently, various models of wireless repeating (relaying) apparatuses capable of repeating (relaying) digital information in the form of electromagnetic waves have been developed by lots of manufactures and are commercially available. FIG. 6 is a schematic block diagram for indicating an arrangement of one conventional wireless repeating apparatus. In FIG. 6, reference numerals 108a to 108c show conventional repeating apparatuses, and reference numeral 102 denotes an information transmitting/receiving unit. The information transmitting/receiving unit 102 receives information transmitted from the wireless repeating apparatus 108a by way of electromagnetic waves, and also transmits the received information to another wireless repeating apparatus 108c by way of electromagnetic waves.

Reference numeral 107 represents an information temporarily storing unit. The information temporarily storing unit 107 temporarily stores thereinto the information received by the information transmitting/receiving unit 102, and outputs the temporarily stored information to the information transmitting/receiving unit 102 when information is transmitted. Reference numeral 104 indicates a channel switching unit for switching channels of electromagnetic waves to be transmitted/received. Also, reference numeral 105 represents a control unit for controlling an entire arrangement of the wireless repeating apparatus 108b to provide a function as the wireless repeating apparatus. Reference numeral 106 indicates an external connecting unit for connecting an information processing apparatus 110 such as a personal computer to the information temporarily storing unit 107 so as to supply/receive information between the information processing apparatus 110 and the information temporarily storing unit 107. Each of the wireless repeating apparatuses 108a to 108c is arranged by the information transmitting/receiving unit 102, the channel switching unit 104, the control unit 105, the external connecting unit 106, and the information temporarily storing unit 107.

Next, the operation of these wireless repeating apparatuses 108a to 108c will now be explained. In this case, the following operation case is first exemplified. That is, the wireless repeating apparatus 108b receives information which is transmitted from the wireless repeating apparatus 108a provided on the transmission side by way of electromagnetic waves, and then transmits this received information to another wireless repeating apparatus 108c as the reception side in the form of electromagnetic waves. It should be noted that each of the wireless repeating apparatuses 108a to 108c repeats electromagnetic waves. The respective wireless repeating apparatuses 108a to 108c are connected to the information processing apparatus 110 and are operable as wireless transmitters/receivers.

In the case that digital information produced from the information processing apparatus 110 is received via the wireless repeating apparatus 108a by the information transmitting/receiving unit 102 by way of electromagnetic waves, the control unit 105 of the wireless repeating apparatus 108b instructs the information transmitting/receiving unit 102 to receive the electromagnetic waves transmitted by the subject wireless repeating apparatus 108a. In response to this instruction, the information transmitting/receiving unit 102 is brought into such a condition that this information transmitting/receiving unit 102 waits for information in a channel designated by the channel switching unit 104.

When the information transmitting/receiving unit 102 of the wireless repeating apparatus 108b receives the electromagnetic waves transmitted from the wireless repeating apparatus 108a, the information processing apparatus 110 dispatches digital information to the wireless repeating apparatus 108a. The wireless repeating apparatus 108a transmits the received information to the information transmitting/receiving unit 102 of the wireless repeating apparatus 108b by way of electromagnetic waves. As explained above, the digital information transferred by way of the electromagnetic waves of the wireless repeating apparatus 108a is received by the information transmitting/receiving unit 102 of the wireless repeating apparatus 108b and then is stored in the information temporarily storing unit 107.

When an amount of information temporarily stored in the information temporarily storing unit 107 exceeds a predetermined amount, the control unit 105 instructs the information transmitting/receiving unit 102 to transmit the information stored in the information temporarily storing unit 107 to another wireless repeating apparatus 108c. Then, in the case that the information transmitting/receiving unit 102 of the wireless repeating apparatus 108b receives the transmission instruction issued from the control unit 105, this information transmitting/receiving unit 102 commences the transmission to the wireless repeating apparatus 108c in the channel designated by the channel switching unit 104. Subsequently, the wireless repeating apparatus 108b repeatedly performs the receiving/transmitting operations of the digital information until the transmission of the digital information dispatched from the information processing apparatus 110 is accomplished.

In the case that the wireless repeating apparatus 108a is connected to the information processing apparatus 110, this wireless repeating apparatus 108a functions as either a wireless transmitting apparatus or a wireless receiving apparatus. When the wireless repeating apparatus 108a functions as the wireless transmitting apparatus, the transmission information is supplied from the information processing apparatus 110 via the external connecting unit 106 of the wireless repeating apparatus 108a to the information temporarily storing unit 107 of the wireless repeating apparatus 108a so as to be stored into this information temporarily storing unit 107.

In such a case that an amount of information stored in the information temporarily storing unit 107 of the wireless repeating apparatus 108a exceeds a predetermined amount, the control unit 105 of the wireless repeating apparatus 108a instructs the information transmitting/receiving unit 102 to transmit the information stored in the information temporarily storing unit 107 to the subject wireless repeating apparatus 108b.

Then, in the case that the information transmitting/receiving unit 102 of the wireless repeating apparatus 108a receives the transmission instruction issued from the control unit 105, this information transmitting/receiving unit 102 commences the transmission in the channel designated by the channel switching unit 104 of the wireless repeating apparatus 108a. Subsequently, the wireless repeating apparatus 108a repeatedly performs the receiving/transmitting operations of the digital information until the transmission of the digital information produced from the information processing apparatus 110 is accomplished, and also all of the information stored in the information temporarily storing unit 107 of the wireless repeating apparatus 108a have been completely transmitted.

When the wireless repeating apparatus 108a functions as the wireless receiving apparatus, the control unit 105 of the wireless repeating apparatus 108a instructs the information transmitting/receiving unit 102 of the wireless repeating apparatus 108a to receive the electromagnetic waves transmitted by the subject wireless repeating apparatus 108b. In response to this instruction issued from the control unit 105, the information transmitting/receiving unit 102 of the wireless repeating apparatus 108a is brought into such a condition that this information transmitting/receiving unit 102 waits for information in a channel designated by the channel switching unit 104 of the wireless repeating apparatus 108a.

The information transmitting/receiving unit 102 of the wireless repeating apparatus 108a receives the electromagnetic waves transmitted from the wireless repeating apparatus 108b, and receives the digital information transmitted by way of the electromagnetic waves. Thus, while the information transmitting/receiving unit 102 of the wireless repeating apparatus 108a receives the electromagnetic waves sent from the wireless repeating apparatus 108b, the digital information transferred by way of the electromagnetic waves is stored via the information transmitting/receiving unit 102 of the wireless repeating apparatus 108a to the information temporarily storing unit 107 of the wireless repeating apparatus 108a.

When an amount of information temporarily stored in the information temporarily storing unit 107 exceeds a predetermined amount, the control unit 105 of the wireless repeating apparatus 108a instructs to transmit the information stored in the information temporarily storing unit 107 of the wireless repeating apparatus 108a to the information processing apparatus 110 via the external connecting unit 106.

Upon receipt of the transmission instruction issued from the control unit 105, the information transmitting/receiving unit 102 of the wireless repeating apparatus 108a reads out the digital information from the information temporarily storing unit 107, and then starts to transfer this read digital information via the external connecting unit 106 to the information processing apparatus 110. Subsequently, this read/transfer operation is continuously carried out until the reception operation of the information transmitting/receiving unit 102 of the wireless repeating apparatus 108a is completed, and also all of the information stored in the information temporarily storing unit 107 of the wireless repeating apparatus 108a have been transferred.

In these conventional wireless repeating apparatuses 108a to 108c, the information transmitted from the information processing apparatus 110 via the wireless repeating apparatus 108a is received by the wireless repeating apparatus 108b, and then this received information can be transmitted from the wireless repeating apparatus 108b to another wireless repeating apparatus 108c by way of the electromagnetic waves.

However, although the above-described wireless repeating apparatuses 108a to 108c are equipped with the function of the electromagnetic wave repeater, the function of the wireless transmitter, and the function of the wireless receiver, the communication counter parties are fixed. Then, the information to be sent from the wireless repeating apparatus 108a to 108c is transmitted from the information processing apparatus 110 every time the information transmission request is issued from the external appliance. As a consequence, even when the same information is repeatedly requested, the information processing apparatus 110 is required to be operated every time such a request is issued. Thereafter, this may cause the workloads given to both the information processing apparatus 110 and the wireless repeating apparatuses 108a to 108c to be increased.

SUMMARY OF THE INVENTION

Accordingly, the present invention has been made to solve the above-described problems, and therefore, has an object to provide such a wireless repeating apparatus. That is, while not only storage information to be repeated by way of electromagnetic waves is temporarily stored but also a series of information is stored which is transmitted from an information processing apparatus and a portable wireless information terminal, this wireless repeating apparatus can directly transmit the stored storage information even plural times to a transmission request source in response to a transmission request issued from an unspecified portable wireless information terminal.

A wireless repeating apparatus, according to the present invention, is featured by such a wireless repeating apparatus for receiving information to be repeated, which is transmitted from a wireless communication apparatus provided on a transmission side by way of electromagnetic waves, and also for transmitting the received information to be repeated to a wireless communication apparatus provided on a reception side by way of electromagnetic waves, comprising: information storing means for storing thereinto information; and storage information transmitting means for reading the storage information from the information storing means in the case that a transmission request of the storage information is received from an external wireless communication apparatus, and for transmitting the read storage information to the external wireless communication apparatus functioning as the transmission request source by way of electromagnetic waves.

Also, the wireless repeating apparatus is featured by that the wireless repeating apparatus is further comprised of information receiving means for receiving information which is transmitted from the external wireless communication apparatus by way of electromagnetic waves; and the information storing means stores thereinto the received information.

Also, the wireless repeating apparatus is featured by that the wireless repeating apparatus is further comprised of information receiving means for receiving information which is transmitted from the external wireless communication apparatus by way of a cable; and the information storing means stores thereinto the received information.

Also, the wireless repeating apparatus is featured by that the information storing means temporarily stores the information to be repeated which is transmitted from the wireless communication apparatus provided on the transmission side by way of the electromagnetic waves.

Also, the wireless repeating apparatus is featured by that the wireless repeating apparatus is further comprised of information temporarily storing means for temporarily storing thereinto the information to be repeated which is transmitted from the wireless communication apparatus provided on the transmission side by way of the electromagnetic waves.

Also, the wireless repeating apparatus is featured by that the wireless repeating apparatus is further comprised of transmission control means for transmitting the repeating information in high power when the repeating information is repeated, and for transmitting information-dispatching information in low power when the information-dispatching information is transmitted.

DETAILED DESCRIPTION OF THE PREFERRED EMBODIMENTS

Now, an embodiment mode of the present invention will be described with reference to the drawings.

Embodiment 1

Figure 1:
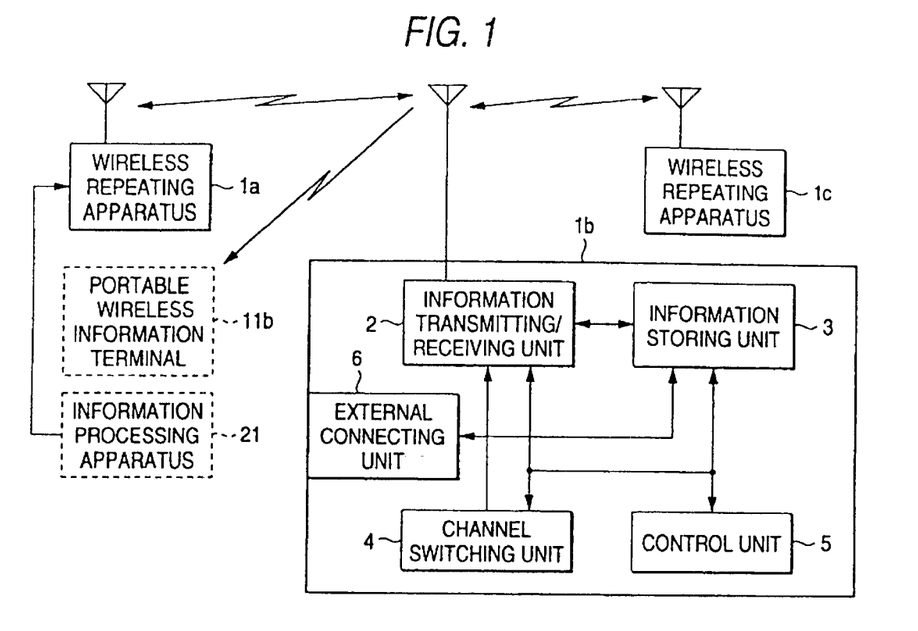
FIG. 1 is a block diagram showing an arrangement of a wireless repeating apparatus according to an embodiment 1 of the present invention.

FIG. 1 is a schematic block diagram representing an arrangement of a wireless repeating apparatus according to an embodiment 1 of the present invention. In FIG. 1, reference numerals "1a" to "1c" indicate wireless repeating apparatuses. Also, reference numeral 2 shows an information transmitting/receiving unit for receiving information sent by way of electromagnetic waves from the wireless repeating apparatus 1a provided on the transmission side, and also for transmitting the received information by way of electronic waves to another wireless repeating apparatus 1c provided on the reception side.

Reference numeral 3 represents an information storing unit for storing thereinto either a series of completed reception information or all of transmission information, reference numeral 4 shows a channel switching unit for switching a channel of an electromagnetic wave to be transmitted/received, and reference numeral 5 indicates a control unit for controlling an entire arrangement of this wireless repeating apparatus, and for providing the function as the wireless repeating apparatus. Also, reference numeral 6 shows an external connecting unit for connecting an information processing apparatus 21 such as a personal computer to the information storing unit 3, and for communicating information between these units. This external connecting unit 6 is connected via a cable to the information processing apparatus 21.

Also, reference numeral 11b represents a portable wireless information terminal. This portable wireless information terminal 11b requests the information transmitting/receiving unit 2 of the wireless repeating apparatus 1b to transmit the storage information stored in the information storing unit 3. In response to this transmission request, the information stored in the information storing unit 3 is read out by the information transmitting/receiving unit 2, and then is transmitted in the form of electromagnetic waves. Then, this transmitted information is received by the portable wireless information terminal. Each of these wireless repeating apparatus 1a to 1c is constituted by the information transmitting/receiving unit 2, the information storing unit 3, the channel switching unit 4, the control unit 5, and the external connecting unit 6.

Next, a description will now be made of operations of the wireless repeating apparatuses 1a to 1c shown in FIG. 1. The respective wireless repeating apparatuses 1a to 1c have a transmission function, a reception function, a repeating function, and also an information dispatching function. The transmission function, the reception function, and the repeating function are the same functions as explained in the conventional wireless repeating apparatuses 108a to 108c shown in FIG. 6, although the storage capacity of the information storing unit 3 is larger than that of the information temporarily storing unit 107 employed in the conventional wireless repeating apparatus shown in FIG. 6. As a consequence, in this embodiment, the information dispatching function is mainly explained.

The digital information supplied from the information processing apparatus 21 via the external connecting unit 6 of the wireless repeating apparatus 1a is stored into the information storing unit 3 of the wireless repeating apparatus 1a. The storage information stored into the information storing unit 3 of the wireless repeating apparatus 1a corresponds to such completed information constructed of either one or plural storage information, for example, information which can be displayed by the portable wireless information terminal 11b.

Figure 2:
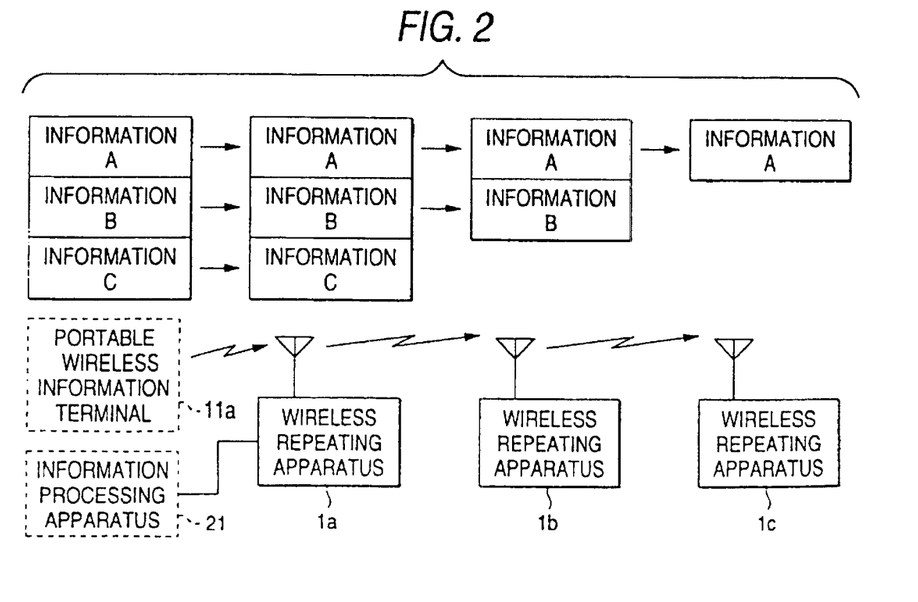
FIG. 2 is a diagram representing a condition in which information sequentially dispatched from a portable wireless information terminal and an information processing apparatus shown in FIG. 1 is stored in a wireless repeating apparatus.

FIG. 2 illustratively shows such conditions that information "A", information "B", and information "C" which are sequentially dispatched from either the portable wireless information terminal 11a or the information processing apparatus 21, are stored into the wireless repeating apparatuses 1a, 1b, 1c, respectively. As to the information "A", a transmission destination is the wireless repeating apparatus 1c. As to the information "B", a transmission destination is the wireless repeating apparatus 1b. As to the information "C", a transmission destination is the wireless repeating apparatus 1a.

The wireless repeating apparatus 1a receives the information "A" to "C" dispatched from the portable wireless information terminal 11a and the information processing apparatus 21, and stores the information "C" directed to the own information transmitting/receiving unit 2 into the information storing unit 3, and further transmits the information "A" and "B" which are not directed to the own information transmitting/receiving unit 2 to the wireless repeating apparatus 1b. Upon receipt of the information "A" and "B" transmitted from the wireless repeating apparatus 1a, the information transmitting/receiving unit 2 of the wireless repeating apparatus 1b stores the information "B" directed to the own information transmitting/receiving unit 2 into the information storing unit 3, and also transmits the information "A" which is not directed to the own information transmitting/receiving unit 2 to the wireless repeating apparatus 1c.

When the information "A" transmitted from the wireless repeating apparatus 1b is received by the information transmitting/receiving unit 2 of the wireless repeating apparatus 1c, since this information "A" is directed to the own information transmitting/receiving unit 2, this information "A" is stored into the information storing unit 3. As a result, as explained above, the information "C" is stored into the information storing unit 3 of the wireless repeating apparatus 1a, the information "B" is stored into the information storing unit 3 of the wireless repeating apparatus 1b, and the information "A" is stored into the information storing unit 3 of the wireless repeating apparatus 1c.

Under such a condition that the storage operations of the respective information "A" to "C" into the information storing unit 3 employed in the wireless repeating apparatuses 1a to 1c have been accomplished, in response to the instruction issued from the channel selecting unit, the channel through which the information can be dispatched is switched every time preselected time has passed, and the information transmitting/receiving units 2 of the wireless repeating apparatuses 1a to 1c are brought into such a condition that the information dispatch requests issued from the portable wireless information terminals 11a to 11c can be received.

Figure 3:
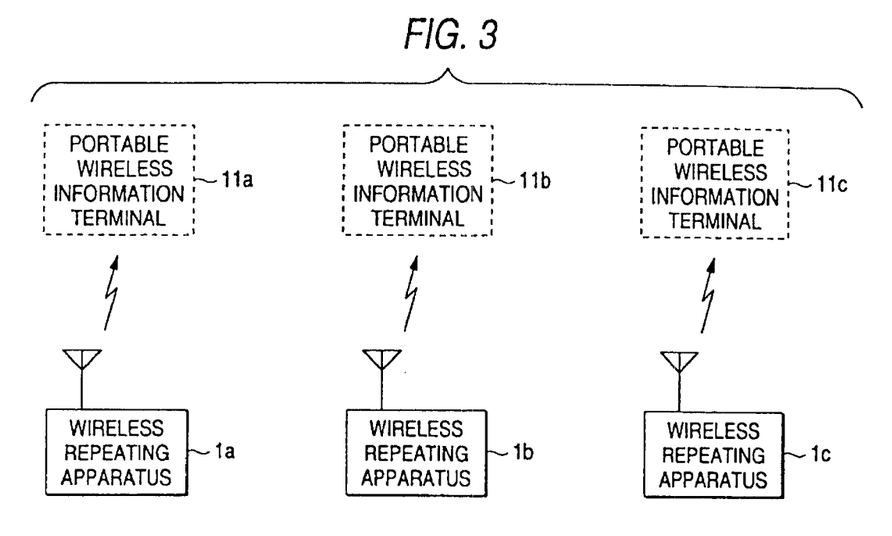
FIG. 3 is a diagram showing a condition which storage information is transmitted from the wireless repeating apparatus shown in FIG. 1 to the portable wireless information terminal as an information-dispatching request source.

When the information dispatch requests are issued from the portable wireless information terminals 11a to 11c, the information transmitting/receiving units 2 of the wireless repeating apparatuses 1a to 1c transmit the storage information stored in the information storing unit 3 to the request issuing source. FIG. 3 represents this condition. That is, the information stored in the wireless repeating apparatuses 1a to 1c is transmitted to the portable wireless information terminals 11a to 11c functioning as the information request source.

Concretely speaking, upon receipt of a transmission request of storage information issued from the portable wireless information terminal 11a, the information transmitting/receiving unit 2 of the wireless repeating apparatus 1a reads out the storage information from the information storing unit 3, and then transmits the read storage information to the portable wireless information terminal 11a functioning as the transmission request source. Upon receipt of a transmission request of storage information issued from the portable wireless information terminal 11b, the information transmitting/receiving unit 2 of the wireless repeating apparatus 1b reads out the storage information from the information storing unit 3, and then transmits the read storage information to the portable wireless information terminal 11b functioning as the transmission request source.

Upon receipt of a transmission request of storage information issued from the portable wireless information terminal 11c, the information transmitting/receiving unit 2 of the wireless repeating apparatus 1c reads out the storage information from the information storing unit 3, and then transmits the read storage information to the portable wireless information terminal 11c functioning as the transmission request source. Then, at the time instant when the information stored in the information storing unit 3 of each of the wireless repeating apparatuses 1a to 1c has been transferred to the respective portable wireless information terminals 11a to 11c of the request issuing sources, the transmission of the information is completed.

Figure 4:
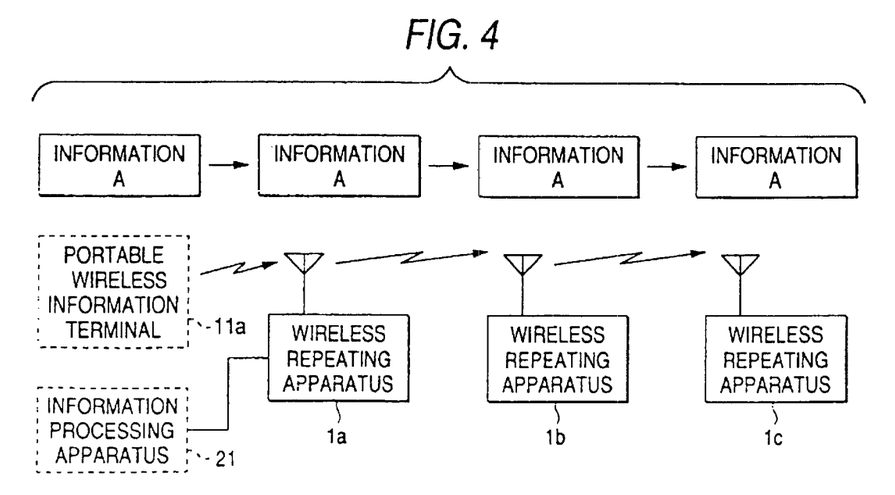
FIG. 4 is a diagram representing a condition in which information sequentially dispatched from a portable wireless information terminal and an information processing apparatus shown in FIG. 1 is stored in a wireless repeating apparatus.

Subsequently, every time the information dispatch requests are issued from the portable wireless information terminals 11a to 11c to the wireless repeating apparatuses 1a to 1c, the storage information stored in the information storing unit 3 is dispatched from the wireless repeating apparatus 1a to 1c. It should be understood that when the same information is stored into the wireless repeating apparatuses 1a to 1c, as indicated in FIG. 4, the information "A" may be dispatched only one time from either the portable wireless information terminal 11a or the information processing apparatus 21. In this case, as to the information "A", as the transmission destination, three sets of the wireless repeating apparatuses 1a to 1c are allocated.

As previously explained, in accordance with this embodiment 1, the wireless repeating apparatuses 1a to 1c are arranged as follows: While a series of information transmitted from either the portable wireless information terminal 11a or the information processing apparatus 21 is stored into the information storing unit 3, for instance, in the case that the transmission requests of the storage information are received from the portable wireless information terminals 11a to 11c by the information transmitting/receiving unit 2, the storage information is read out from the information storing unit 3, and then this read storage information is transmitted to the portable wireless information terminals 11a to 11c functioning as the transmission request source by way of the electromagnetic waves. As a consequence, not only the repeating storage information to be repeated in the form of electromagnetic waves is temporarily stored, but also a series of information dispatched from either the information processing apparatus 21 or the portable wireless information terminal 11a is stored. Then, in response to the transmission request issued from an unspecified terminal among the portable wireless information terminals 11a to 11c, the stored storage information can be directly dispatched to the portable wireless information terminals 11a to 11c as the transmission request source even plural times.

Also, as represented in FIG. 3, in accordance with this embodiment 1, since the wireless repeating apparatuses 1a to 1c themselves can solely dispatch the information, after the information has been once received from the information processing apparatus 21 and/or the portable wireless information terminal 11a, the information is no longer required to be transferred from the information processing apparatus and/or the portable wireless information terminal 11a only while the information having the same content is dispatched in response to the request issued from the unspecified terminal among the portable wireless information terminals 11a to 11c. Furthermore, the information transfer capabilities of the wireless repeating apparatuses 1a to 1c can be perfectly utilized so as to dispatch the information. As a result, the load given to the system can be reduced and the utilization efficiency of electromagnetic waves can be increased.

Embodiment 2

Figure 5:
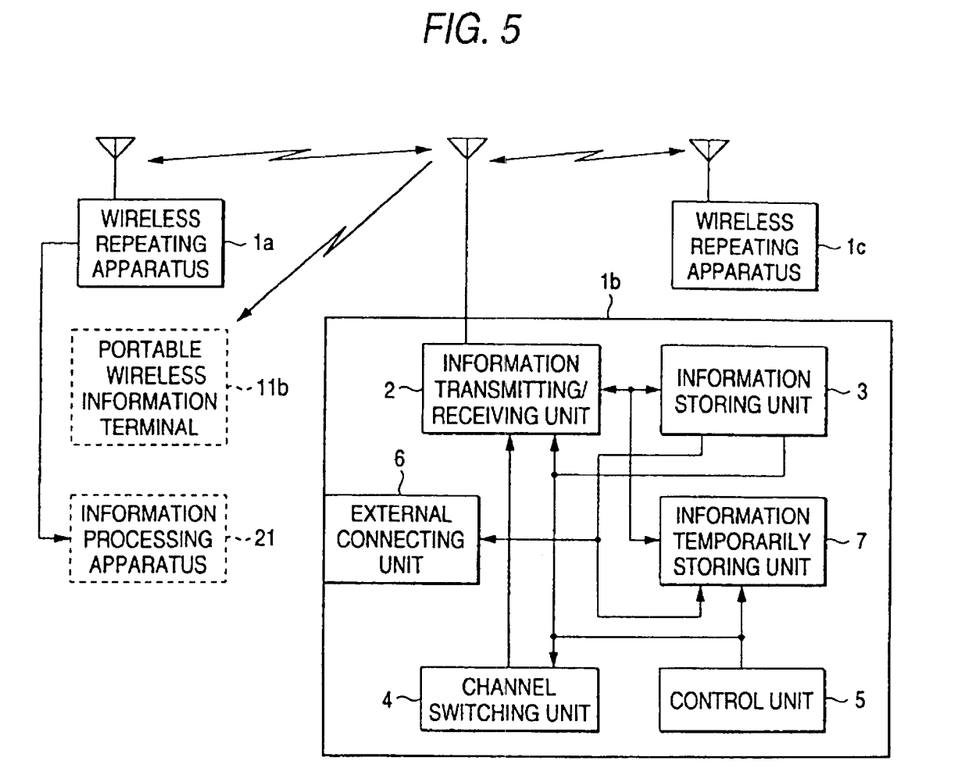
FIG. 5 is a block diagram showing an arrangement of a wireless repeating apparatus according to an embodiment 2 of the present invention.

FIG. 5 is a schematic block diagram showing an arrangement of a wireless repeating apparatus according to an embodiment 2 of the present invention. It should be noted that the same reference numerals shown in FIG. 1 will be employed as those for denoting the same, or similar components of FIG. 5. Reference numeral 7 indicates an information temporarily storing unit having a function equivalent to that of the information temporarily storing unit 107 employed in the conventional wireless repeating apparatus shown in FIG. 6. That is, the information temporarily storing unit 107 temporarily stores thereinto the information received by the information transmitting/receiving unit 2, and also outputs the temporarily stored information to the information transmitting/receiving unit 2 when the information is transmitted.

In this embodiment 2, since the wireless repeating apparatus is arranged in a similar manner to that of the embodiment 1 shown in FIG. 1 except that this information temporarily storing unit 7 is additionally provided, only different structural element will be explained. In the embodiment 1, both the repeating information and the information-dispatching information are stored in the information storing unit 3. In this embodiment 2, as represented in FIG. 5, while the information-dispatching information is stored into the information storing unit 3, the repeating information is temporarily stored into the information temporarily storing unit 7. As a consequence, as to the transmission function, the reception function, and the repeating function, the information temporarily storing unit 7 is used as same as in the conventional wireless repeating apparatus. Thus, the wireless repeating function can be provided without rewriting the information which has been stored into the information storing unit 3.

In the above-explained embodiments 1 and 2, the following assumptions are made. That is, the transmission output power when the repeating information is repeated is made equal to the transmission output power when the information-dispatching information is dispatched. Alternatively, the information transmitting/receiving unit 2 may be provided with a transmission control function. That is, when the repeating information is repeated, this repeating information may be transmitted in high power, whereas when the information-dispatching information is dispatched, this information-dispatching information may be transmitted in low power.

For example, in such a case that a plurality of wireless repeating apparatuses are arranged at places separated from each other every 100 m, since the wireless repeating apparatuses require such electric power capable of delivering information over 100 m in order to satisfy the repeating function, the repeating information is transmitted in high power. On the other hand, when the information-dispatching information is provided, if this information-dispatching information is delivered over 100 m, then the information interference would occur. Therefore, this information-dispatching information may be transmitted in lower power, as compared with repeating of the repeating information.

The wireless repeating apparatus, according to the present invention, is arranged as follows: While the information is stored into the information storing means, when the transmission request of the storage information from the external wireless communication apparatus is received by the storage information transmitting means, the storage information is read out from the information storing means, and this read storage information is transmitted to the external wireless communication apparatus as the transmission request source by way of the electromagnetic waves. As a result, while a series of information dispatched from the information processing apparatus and the portable wireless communication terminal is stored, the stored storage information can be directly dispatched to the portable wireless information terminal as the transmission request source even plural times in response to the transmission request issued from the unspecified portable wireless terminal.

In the wireless repeating apparatus according to the present invention, the information transmitted from the external wireless communication apparatus in the form of the electromagnetic waves can be received by the information receiving means, and then this received information can be stored by the information storing means.

In the wireless repeating apparatus according to the present invention, the information transmitted from the external wireless communication apparatus by way of the cable can be received by the information receiving means, and then this received information can be stored by the information storing means.

In the wireless repeating apparatus according to the present invention, the repeating information which is transmitted from the wireless communication apparatus provided on the transmission side by way of the electromagnetic waves can be temporarily stored by the information storing means.

In the wireless repeating apparatus according to the present invention, the repeating information which is transmitted from the wireless communication apparatus provided on the transmission side by way of the electromagnetic waves can be temporarily stored by the information temporarily storing means.

In the wireless repeating apparatus according to the present invention, when the repeating information is repeated, this repeating information can be transmitted in high power by the transmission control means, whereas when the information-dispatching information is transmitted, this information-dispatching information can be transmitted in low power.

What is claimed is:

1. A wireless repeating apparatus for receiving information to be repeated, transmitted from a wireless communication apparatus on a transmission side by way of electromagnetic waves, and also for transmitting the received information to be repeated to a wireless communication apparatus on a reception side by way of electromagnetic waves, the apparatus comprising:

information receiving means for receiving information from an external source of the information in response to a transmission request from an external wireless communication apparatus;

information storing means for storing the information as stored information; and storage information transmitting means for reading the stored information from said information storing means when another transmission request for the stored information is received and for transmitting the stored information, without repeatedly retrieving the information from the external source, to the external wireless communication apparatus, as a transmission request source, by way of electromagnetic waves.

2. The wireless repeating apparatus as claimed in claim 1 comprising transmission control means for transmitting the information to be repeated at a high power when the information to be repeated is repeated, and for transmitting information-dispatching information at lower power when the information-dispatching information is transmitted.

3. The wireless repeating apparatus as claimed in claim 1 wherein said information receiving means receives information-dispatching information from a wireless information terminal, and said information storing means stores the information received as information-dispatching information.

4. The wireless repeating apparatus as claimed in claim 1 further comprising external connecting means for connecting to an information processing apparatus via a cable, wherein said information storing means stores information to be repeated and information-dispatching information, the information to be repeated being received through the information receiving means, and the information-dispatching information being received from the information processing apparatus through the external connecting means.

5. The wireless repeating apparatus as claimed in claim 4 wherein said storage information transmitting means responds to a plurality of requests for the same information and said information storing means provides the information without access to the information processing apparatus.

6. The wireless repeating apparatus as claimed in claim 4, wherein said external connecting means receives information transmitted from the information processing apparatus through the cable, and said information storing means stores the information transmitted by the information processing apparatus.

7. The wireless repeating apparatus as claimed in claim 4 wherein said information storing means comprises a temporary-information storing means for temporarily storing the information to be repeated and a non-temporary-information storing means for persistently storing the information-dispatching information.

8. A wireless repeating system comprising:
   a first repeating apparatus communicating with a source of information through one of electromagnetic waves and a cable;
   a second repeating apparatus communicating with the first repeating apparatus and with a plurality of wireless information terminals, for transmitting information, in response to a transmission request from one of the wireless information terminals, without access to said first repeating apparatus for the information when said second repeating apparatus has already transmitted the information previously, the information having been previously retrieved from the source of information via said first repeating apparatus.

9. The wireless repeating system according to claim 8, wherein said second repeating apparatus comprises:
   a receiver for receiving a plurality of transmission requests through electromagnetic waves; and
   a transmitter for transmitting information to the wireless information terminals through electromagnetic waves; and
   a controller connected to said receiver and said transmitter.

10. The wireless repeating system according to claim 8, wherein said transmitter transmits the transmission requests at lower power than transmission of information to another repeating apparatus.

11. The wireless repeating system according to claim 8, wherein said second repeating apparatus comprises an information storing unit for storing the information transmitted from the source of information for response to subsequent transmission requests.

12. The wireless repeating system according to claim 11, wherein said information storing unit stores temporal information, as repeating information, to be repeated to another repeating apparatus.

* * * * *